Feb. 23, 1937.  M. A. WECKERLY  2,071,443
WEIGHING SCALE
Filed Sept. 1, 1934  4 Sheets-Sheet 3
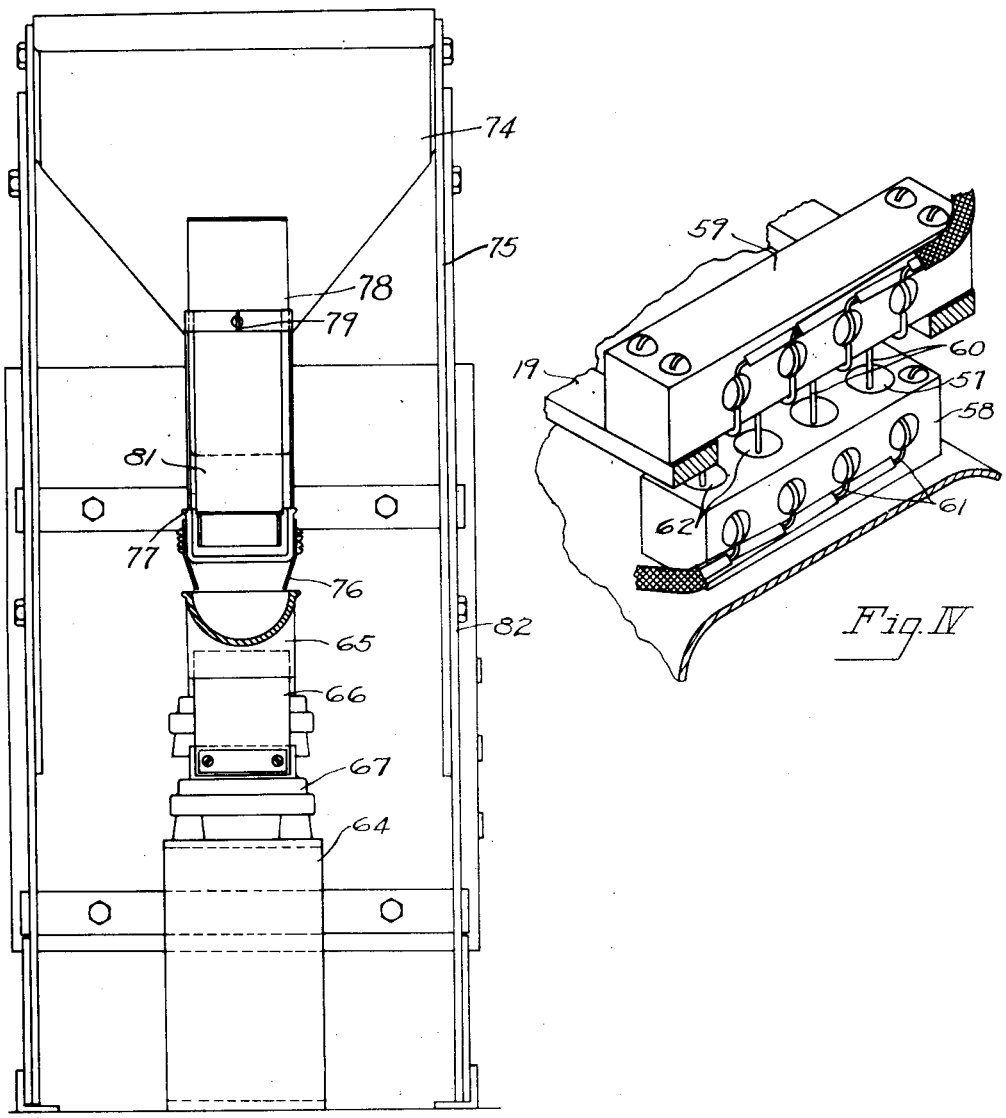
Fig. III
Fig. IV
Mark A Weckerly
INVENTOR
BY C M Marshall
ATTORNEY

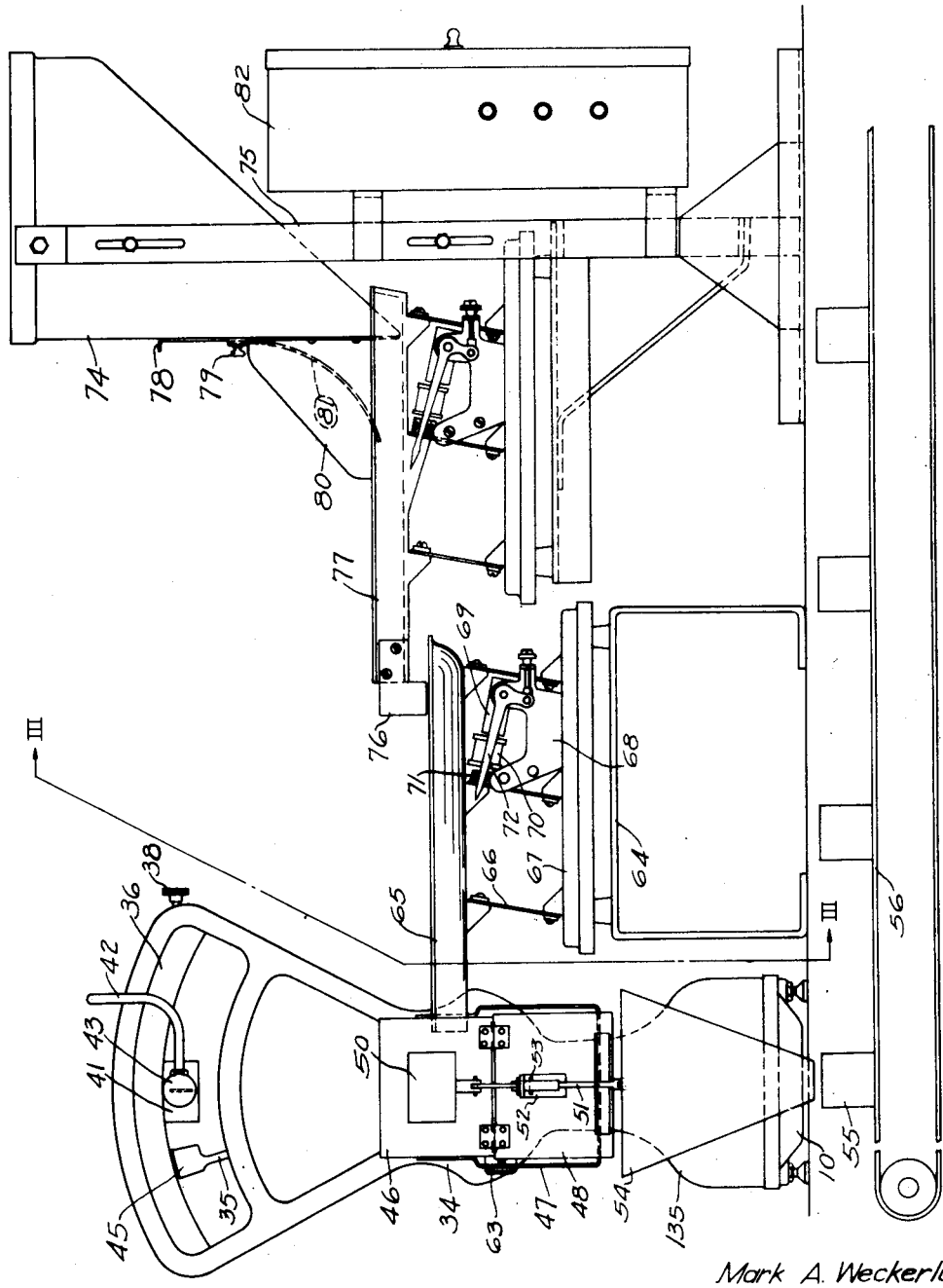

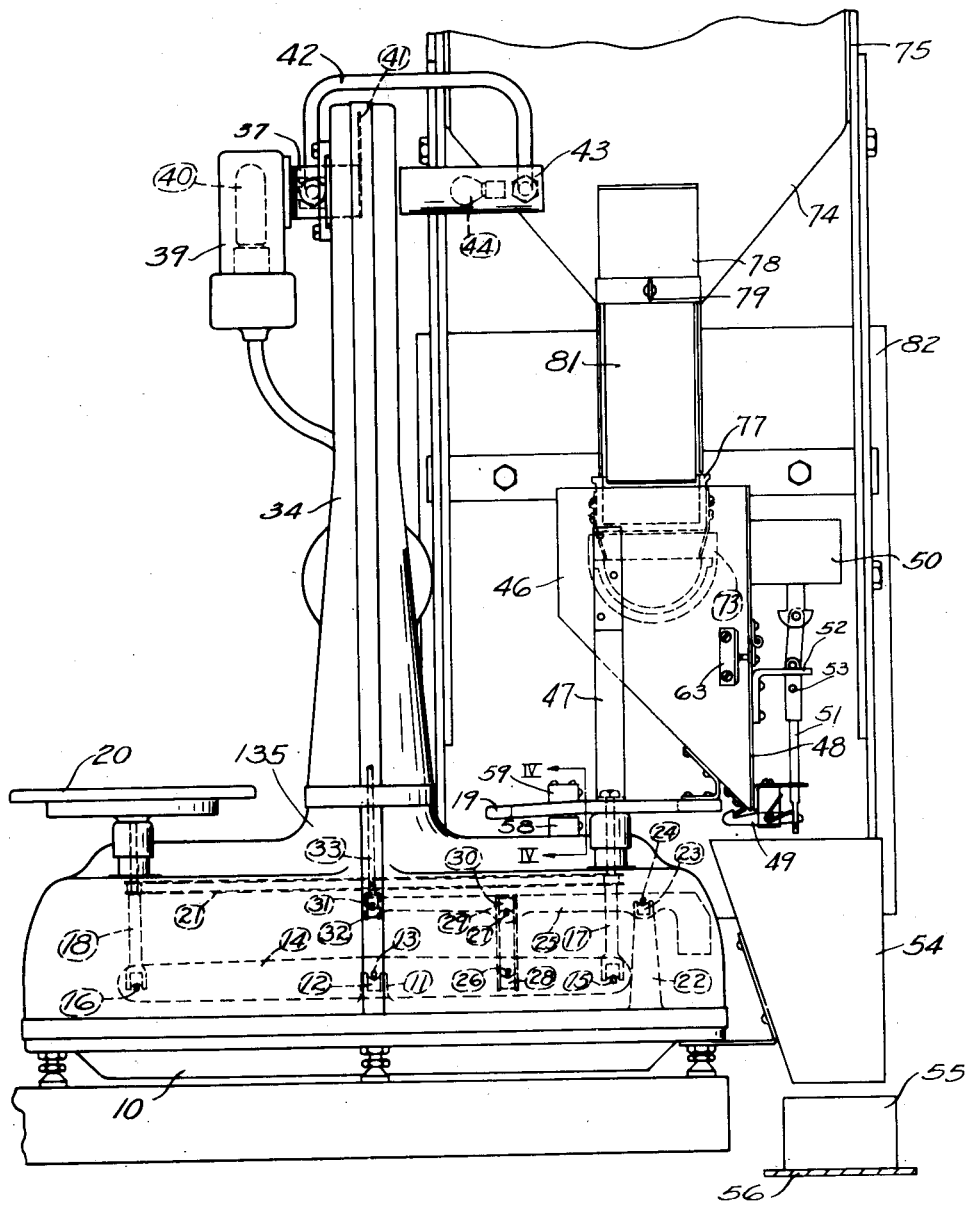

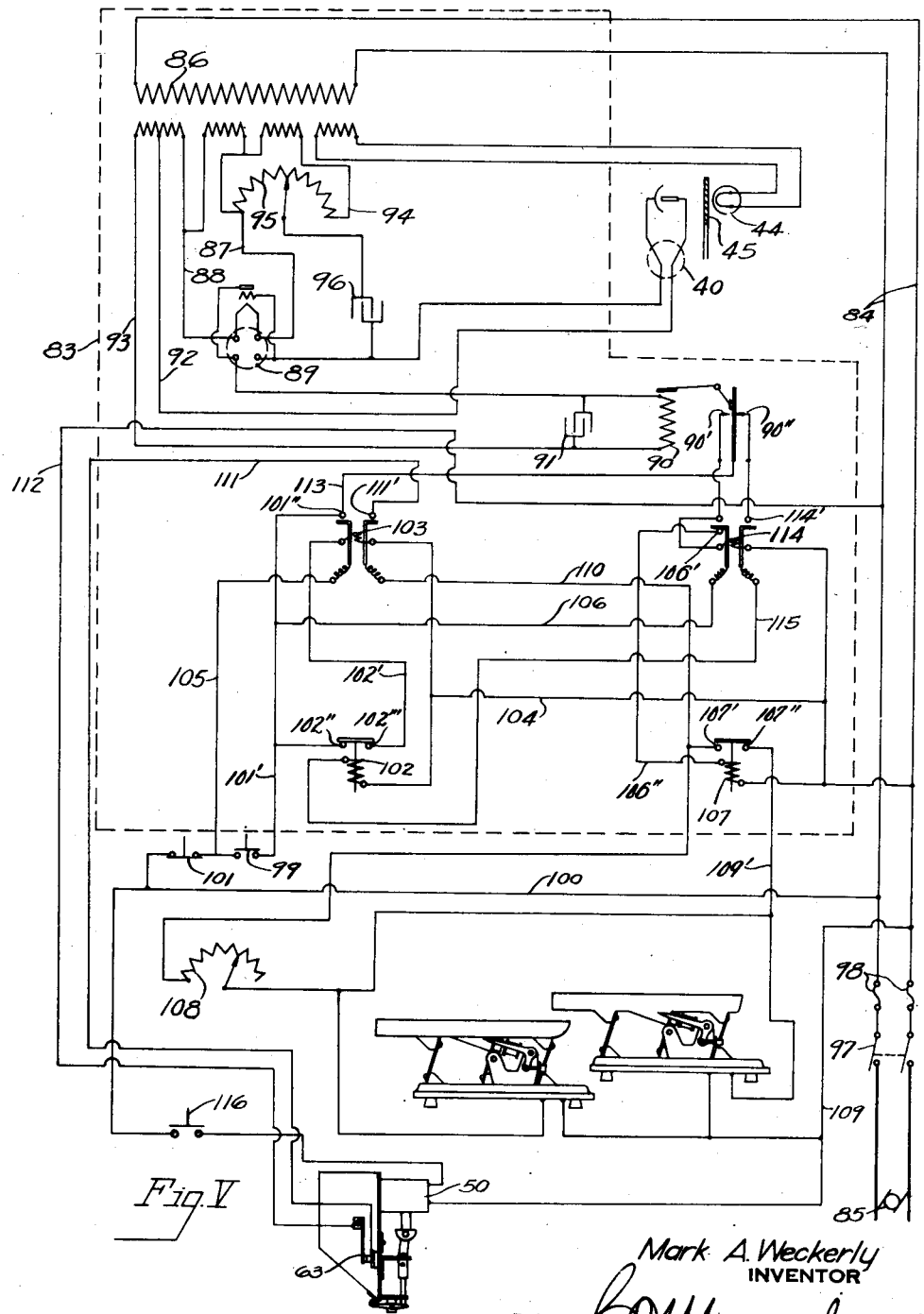
Fig. V

Patented Feb. 23, 1937

2,071,443

UNITED STATES PATENT OFFICE 2,071,443

WEIGHING SCALE

Mark A. Weckerly, Toledo, Ohio, assignor to Toledo Scale Manufacturing Company, Toledo, Ohio, a corporation of New Jersey Application September 1, 1934, Serial No. 742,427

8 Claims. (Cl. 249—63)

In weighing scales for measuring out predetermined quantities of solid material, it is very difficult to feed the material rapidly to the scale platform and at the same time to stop the flow of material thereto after the exact predetermined weight has been fed, particularly when the particles are relatively large and not free-flowing, but are to be weighed out accurately in small batches.

The principal object of this invention is to provide a weighing scale in which solid material may be rapidly fed to a weighing receptacle and the feed stopped at the proper instant so that an exact predetermined quantity of material is weighed out.

More specific objects and advantages are apparent from the description, in which reference is had to the accompanying drawings illustrating a preferred embodiment of the invention.

Figure I of the drawings is a front elevation of a weighing scale embodying the invention.

Figure II is a side elevation thereof, on a larger scale.

Figure III is a vertical section taken on the line III—III of Figure I, on a similar larger scale.

Figure IV is a further enlarged perspective view of a fragment in section on the line IV—IV of Figure II.

Figure V is a wiring diagram of the electric circuits.

But these specific drawings and the specific description that follows are to disclose and illustrate the invention and not to impose limitations upon the claims.

United States Patent 1,768,478 to H. O. Hem illustrates and describes in detail the preferred type of weighing mechanism shown in Figure II.

Projecting upward from a base 10, which preferably is a rigid iron casting, are brackets 11 holding a pair of hardened V bearings 12 which support fulcrum pivots 13 of an equal armed lever 14. Fixed in each end of this lever in spaced relation to the fulcrum pivots 13 are two pairs of pivots 15 and 16 that support spiders 17 and 18 respectively, which in turn are surmounted by a load receiver 19 and a counterbalance weight relation to the fulcrum pivots 13 are two pairs of by check links 21 that prevent them from tipping.

A second pair of brackets 22 rises upward from the base 10 near one end of the lever 14. Bearings 23 are carried in furcations of the brackets 22 and support fulcrum pivots 24 of an auxiliary lever 25. The levers 14 and 25 are equipped with laterally projecting pivots 26 and 27 which engage bearings 28 and 29 of a connecting link 30.

The auxiliary lever 25 is provided with a nose pivot 31 which rests in a stirrup 32 suspended from the lower end of a rod 33 that is connected to mechanism in the housing 34 for actuating an indicating hand 35.

The housing 34 is mounted on a base casing 135 covering the lever mechanism mounted on the base. In the upper end of the housing 34 is mounted a stationary chart 36 which may be marked with an indication of the position, preferably central, that the indicating hand 35 takes when the weight of the load equals the known weight of the counterbalance on the counterbalance weight receiver 20.

Slidably mounted on the rear of the housing 34 is a bracket 37 adjustable laterally by means of an adjusting screw 38, which has fixed to it a lightproof casing 39 containing a photo-electric cell 40.

Also fixed to the bracket, in front of the cell housing, is an opaque screen 41.

A rigid tube 42 has one end secured to the bracket and the other end bent down in front of the chart housing where it supports a rearwardly directed reflector 43 containing a lamp 44.

In order that a beam of light from the lamp may reach the cell, there are narrow apertures in the front of the cell housing and in the screen. There is of course an opening in the back of the chart housing. The portion of the bracket that carries the screen projects into the opening in the housing so that the screen is flush with the chart 36 and close to the indicating hand 35. Arranged on the end of the indicating hand to cover the screen aperture during a part of the travel of the hand is a shield 45.

For receiving material to be weighed, a batch hopper 46 may be secured to the load receiver 19 by brackets 47. A hinged gate 48 is preferably provided as a means of dumping the hopper, and the gate may be held shut by a latch 49. A solenoid 50 is preferably mounted on the hopper to operate the gate, by means of an arm 51 articulated to the core of the solenoid. Actuation of the solenoid opens the gate, and further actuation closes the gate. In the form illustrated, it is energizing of the solenoid that causes the gate to open, and deenergizing of the solenoid that causes the gate to close by gravity. Hence the operating arm in the form shown is constructed to open the latch 49 in the first part of its movement when the solenoid is energized. It passes through a slot in the bracket 52 attached to the gate, and has passing through it a pin 53 so located as to provide enough lost motion so that the latch is opened before the pin 53 strikes the bracket 52 and opens the gate.

For this type of hopper a chute 54 is ordinarily provided to guide material from the hopper into a receptacle 55, which may be brought into position, and also carried away after filling, by a conveyor 56. The body of the hopper may be made of aluminum to save in weight, although parts subject to wear such as the gate mechanism and the sloping bottom of the hopper are best made of steel.

When the solenoid is mounted on the hopper, the wires leading to the solenoid preferably pass through frictionless contacts in the form of mercury wells 57, where they join the load receiver 19 (see Figure IV). Above the block 58 of insulating material, secured to the base casing, in which the wells are formed is another block 59 of similar material which is fastened to the load receiver 19. A pair of wires 60 of suitable material such as nickel extend into the mercury through a wide opening in the load receiver and thus establish a permanent connection with a pair of wires 61 that enter the mercury wells. Another pair of wells 62 with two corresponding pairs of wires is necessary when a safety switch 63, shown in Figure I, is desired in the circuits to prevent the feeding mechanism from being started before the hopper gate is closed.

The hopper is fed by a secondary conveyor which is preferably of the vibrating type. It is mounted on a platform 64 of suitable height, and comprises a vibratory conduit 65, here in the form of a trough, mounted on spring plates 66 that are secured to a base 67. Also mounted on the conveyor base is a bracket 68 supporting a block 69 on trunnions. At the end of the block is an electromagnet 70 that acts on an armature 71 fastened to the conduit 65. If the conduit is of non-magnetic material, such as aluminum, it cannot cause sticking of iron particles by magnetic attraction. Turning the block on its trunnions so as to lower the electromagnet, by means of a handle 72, decreases the flux from the electromagnet that passes through the armature. The amplitude of vibration of the conduit is thereby lessened when alternating current is passing through the electromagnet.

The resilience of the spring plates 66 and the weight of the conduit should be such that its natural period of vibration corresponds to the frequency of the alternating current. When the current is turned on, particles in the conduit flow smoothly forward, and when it is turned off, the flow stops without perceptible lag. The amplitude of the vibrations is so small and the damping effect of the material in the conduit is such that the conveyor is self-braking. Thus after the current is interrupted only the particles that have already passed over the end of the secondary conveyor can fall into the batch hopper. It is desirable to reduce the number of such particles when the batch does not fill the hopper by providing an opening 73 in the side of the hopper, with a removable closure plate, so that the end of the conduit 65 can be inserted. Compensation for such particles is provided by setting the adjusting screw 38 for laterally positioning the photoelectric unit, which is of course a form of a unit containing a photoelectric cell arranged so that the illumination thereof is varied by the weighing mechanism to stop the feed to the batch hopper when it contains the proper weight of material.

The photoelectric control involves no reactive force and no friction on the scale mechanism, so that the feed to the hopper can be cut off sharply when the weight of the batch is exactly correct without any interference with the accurate weighing mechanism. In fact the photoelectric means has been found so accurate when the last increment of the batch is fed slowly to the batch hopper, that without any pause for checking the weight the hopper may be dumped instantaneously upon the falling therein of the last necessary particle of material.

The source of the material for the feed may be a supply hopper 74 mounted on a vertically adjustable frame 75. Instead of passing directly from the supply hopper to the vibratory conduit 65, the material is carried from the hopper to the conduit by means of one or more conveyors arranged in tandem. Only a single primary conveyor is shown, mounted on the same frame as the supply hopper. It may be arranged at any angle to the secondary conveyor so long as it feeds into the conduit 65, and may be of the same type as the secondary conveyor. If side shields 76 are added at the end of the conduit 77 of the primary conveyor spilling is prevented, but the entire weight of the conduit and shields should be such that a condition of resonance is created by the vibratory motor.

The supply hopper 74 preferably has a narrow lower end extending into the conduit 77 of the primary conveyor and having a sliding gate 78 with a setscrew 79. As an added precaution against spilling side plates 80 are employed. By the use of a resilient shoe such as a spring plate 81 bearing on the stream of particles in the conduit of the primary conveyor a leveling of the material in the conveyor to a substantially constant depth is obtained, so that the flow of material is uniform. The resilient shoe yields slightly to let pass congestions of particles, and makes it possible to open the sliding gate 78 substantially wide to obviate all danger of clogging in the gate.

In any case, when the particles are not free-flowing, the supply hopper gate must be opened wide enough to permit a steady flow of material. The resulting stream in the first conveyor is then heavy although not necessarily swift, and the conveyor needs to be wide to accommodate the stream. Because of the secondary conveying means it is possible to reduce the stream to any desired fineness before it is fed to the batch hopper. If the secondary conveyor is a vibratory conduit, it should be properly shaped, as by rounding the bottom, to make the material flow in a narrow stream. It is also desirable to set the handle 72 of the secondary conveyor and the corresponding handle of the primary conveyor so that the secondary conveyor feeds material the more swiftly.

A narrow, uniform stream of material flowing into the batch hopper makes possible very accurate results. When all but the last few particles are in the hopper, it is desirable to reduce the flow into the hopper to a dribble. All the conveyors need not be controlled in the same manner. Under some conditions it may not be desired to arrest any but the final conveyor, and under other conditions it may be necessary to stop one or more conveyors before the final conveyor is slowed down or stopped.

A cabinet 82 for housing the electrical control apparatus is conveniently mounted on the frame 75. The apparatus housed in the cabinet is shown surrounded by a dotted line 83 on the wiring diagram, Figure V, which represents a preferred control system for the conveyors and batch hopper. Alternating current is supplied from a utility circuit 84 fed by a source 85 and passing through the primary coil 86 of a transformer. By leads tapped into the secondary of the transformer the lamp 44 is supplied with current at proper voltage.

Across other leads 87 and 88 is connected the filament of a thermionic tube 89, whose grid is connected to the cathode of the photoelectric cell 40. The plate of the tube is connected to one side of the coil 90 of a sensitive relay, across which is shunted a smoothing condenser 91. The other side of the sensitive relay coil and the anode of the photoelectric cell are connected by taps 92 and 93 respectively to the secondary. On the opposite side of the filament leads, another tap 94 is provided so that a potentiometer 95 may be connected across the tap and a filament lead 87. The sliding contact of the potentiometer is connected through another smoothing condenser 96 to the grid.

When the cell 40 is illuminated by the lamp 44 a potential is impressed on the grid that increases in amplified degree the flow of current between filament and plate and through the relay coil 90. Since a potential is also impressed on the grid through the potentiometer 95, the latter can be set in such a manner that the plate current is only sufficient to energize the sensitive relay when the shield 45 is not between the photoelectric cell and the lamp.

With a counterbalance having a weight equal to the desired batch weight on the counterbalance weight receiver 20, the indicating hand and the shield are in the position shown in Figure I. Thus the photoelectric cell is illuminated and the sensitive relay is in the energized position indicated in Figure V, the line switch 97 being closed to allow current to flow through fuses 98 to the utility circuit 84. Pressing the starter button 99 starts the operation of the device by completing a circuit through a lead 100, an emergency stop button 101, a wire 101', a back contact or normally closed relay 102, a wire 102', the coil 103 of a two-pole relay, and a return lead 104, so that the two-pole relay closes to complete a shunt through a wire 105, the two-pole relay, the terminal 101" of the wire 101', and around the starter button 99. After the starter button has been released the two-pole relay remains closed because of the shunt through which current passes to the terminal 102" and 102''' and the wire 102' to the coil 103, and current also flows from the shunt through a wire 106 and a normally closed contact 106' of a fourth relay, and thence through a wire 106" to energize the coil 107 of a fifth relay.

By the closing of the fifth relay a dribble feed adjusting rheostat 108 is bridged so that a circuit is established from the utility circuit through a lead 112, the safety switch 63, a wire 111 and its terminal 111', and a wire 110 through the fifth relay contacts 107' and 107" and a wire 109' to the conveyor windings in parallel and thence through a return lead 109 to the utility circuit. The conveyors therefore feed material into the batch hopper at their full rate and the indicating hand and shield move toward the position that indicates equalization of the weight in the hopper with the weight of the counterbalance.

As soon as the shield covers the aperture in the screen 41, the coil 90 of the sensitive relay is deenergized and current flows through the shunting wire 105 and the contact 101" to a wire 113 connected by the sensitive relay and a contact 90' to the coil 114 of the fourth relay. Energization of the fourth relay opens the circuit through the terminal 106', the wire 106" and the coil 107 of the fifth relay. The fifth relay contacts being opened, the circuit through the conveyors includes the dribble feed adjusting rheostat 108 and the potential across the conveyor windings is less, so that the feed continues more slowly and the shield moves more slowly as it crosses the aperture in the screen.

As soon as the shield is far enough along to reexpose the aperture, the sensitive relay is reenergized; but since the separate wire 106 maintains the circuit from the shunting wire 105 through the coil 114 of the fourth relay, that relay remains energized to complete a circuit by way of the sensitive relay from the shunting wire 105, the terminal 101" and the connecting wire 113 through the sensitive relay contact 90", the terminal 114', the fourth relay and a connection 115 to the coil of the back contact or normally closed relay 102 and the return lead 104. Hence, the back contact relay 102 opens to deenergize the coil 103 of the two-pole relay so that the latter opens, breaking the circuits from the shunting wire 105 to the back contact relay 102 and to the fourth relay 114.

Having described my invention, I claim:

1. A device of the class described including, in combination, weighing mechanism, a conveyor, a second conveyor located to receive material from the first said conveyor and deliver such material to said weighing mechanism, the second said conveyor being of the vibratory type, and means for operating said conveyors to cause material to move over the conveyor of the vibratory type at speed greater than that with which it moves over the first said conveyor.

2. A device of the class described including, in combination, weighing mechanism, a vibratory conveyor, a second vibratory conveyor located to receive material from the first said vibratory conveyor and deliver such material to said weighing mechanism, means for vibrating both said vibratory conveyors at a definite rate of vibration, and means for regulating the amplitudes of vibration of each of the said conveyors to cause such material to travel over the second said conveyor at speed greater than that with which it travels over the first said conveyor.

3. A device of the class described including, in combination, weighing mechanism, a vibratory conveyor, a second vibratory conveyor located to receive material from the first said vibratory conveyor and deliver such material to said weighing mechanism, means for vibrating both said conveyors at a definite rate of vibration and at relative amplitudes of vibration to cause such material to travel over the second said conveyor at speed greater than that with which it travels over the first said conveyor.

4. A device of the class described including, in combination, weighing mechanism, a vibratory conveyor, a second vibratory conveyor located to receive material from the first said vibratory conveyor and deliver such material to said weighing mechanism, said vibratory conveyors being resiliently mounted and of such weight that their natural period of vibration corresponds to the frequency of an alternating current, alternating-current-actuated electromagnetic means for vibrating said conveyors at the alternating current frequency, and means controlling the relative amplitudes of vibration of said vibratory conveyors to cause material to move over the second said vibratory conveyor at speed greater than that with which it moves over the first said vibratory conveyor.

5. A device of the class described including, in combination, weighing mechanism, a vibratory conveyor, a second vibratory conveyor located to receive material from the first said vibratory conveyor and deliver such material to said weighing mechanism, said vibratory conveyors being resiliently mounted and of such weight that their natural period of vibration corresponds to the frequency of an alternating current, alternating-current-actuated electromagnetic means for vibrating said conveyors at the alternating current frequency, means controlling the relative amplitudes of vibration of said vibratory conveyors to cause material to move over the second said vibratory conveyor at speed greater than that with which it moves over the first said vibratory conveyor, and means controlled by said weighing mechanism for successively diminishing and cutting off the flow of current to said electromagnetic means as the load on said weighing mechanism approaches and reaches a predetermined amount.

6. A device of the class described including, in combination, weighing mechanism, a vibratory conveyor, a second vibratory conveyor located to receive material from the first said vibratory conveyor and deliver such material to said weighing mechanism, said vibratory conveyors being resiliently mounted and of such weight that their natural period of vibration corresponds to the frequency of an alternating current, alternating-current-actuated electromagnetic means for vibrating said conveyors at the alternating current frequency, means controlling the relative amplitudes of vibration of said vibratory conveyors to cause material to move over the second said vibratory conveyor at speed greater than that with which it moves over the first said vibratory conveyor, and means controlled by said weighing mechanism for cutting off the flow of current to said electromagnetic means as the load on said weighing mechanism reaches a predetermined amount.

7. A device of the class described including, in combination, weighing mechanism, a vibratory conveyor, a second vibratory conveyor located to receive material from the first said vibratory conveyor and deliver such material to said weighing mechanism, said vibratory conveyors being resiliently mounted and of such weight that their natural period of vibration corresponds to the frequency of an alternating current, alternating-current-actuated electromagnetic means for vibrating said conveyors at the alternating current frequency, means controlling the relative amplitudes of vibration of said vibratory conveyors to cause material to move over the second said vibratory conveyor at speed greater than that with which it moves over the first said vibratory conveyor, and photo-electric means controlled by said weighing mechanism for successively diminishing and cutting off the flow of current to said electromagnetic means as the load on said weighing mechanism approaches and reaches a predetermined amount.

8. A device of the class described including, in combination, weighing mechanism, a vibratory conveyor, a second vibratory conveyor located to receive material from the first said vibratory conveyor and deliver such material to said weighing mechanism, said vibratory conveyors being resiliently mounted and of such weight that their natural period of vibration corresponds to the frequency of an alternating current, alternating-current-actuated electromagnetic means for vibrating said conveyors at the alternating current frequency, means controlling the relative amplitudes of vibration of said vibratory conveyors to cause material to move over the second said vibratory conveyor at speed greater than that with which it moves over the first said vibratory conveyor, and photo-electric means controlled by said weighing mechanism for cutting off the flow of current to said electromagnetic means as the load on said weighing mechanism reaches a predetermined amount.

MARK A. WECKERLY.